E. W. BURGESS.
GRAIN HARVESTER.
APPLICATION FILED JULY 5, 1916.

1,278,102.

Patented Sept. 10, 1918.
2 SHEETS—SHEET 1.

Inventor
Edward W. Burgess.
By:
Atty.

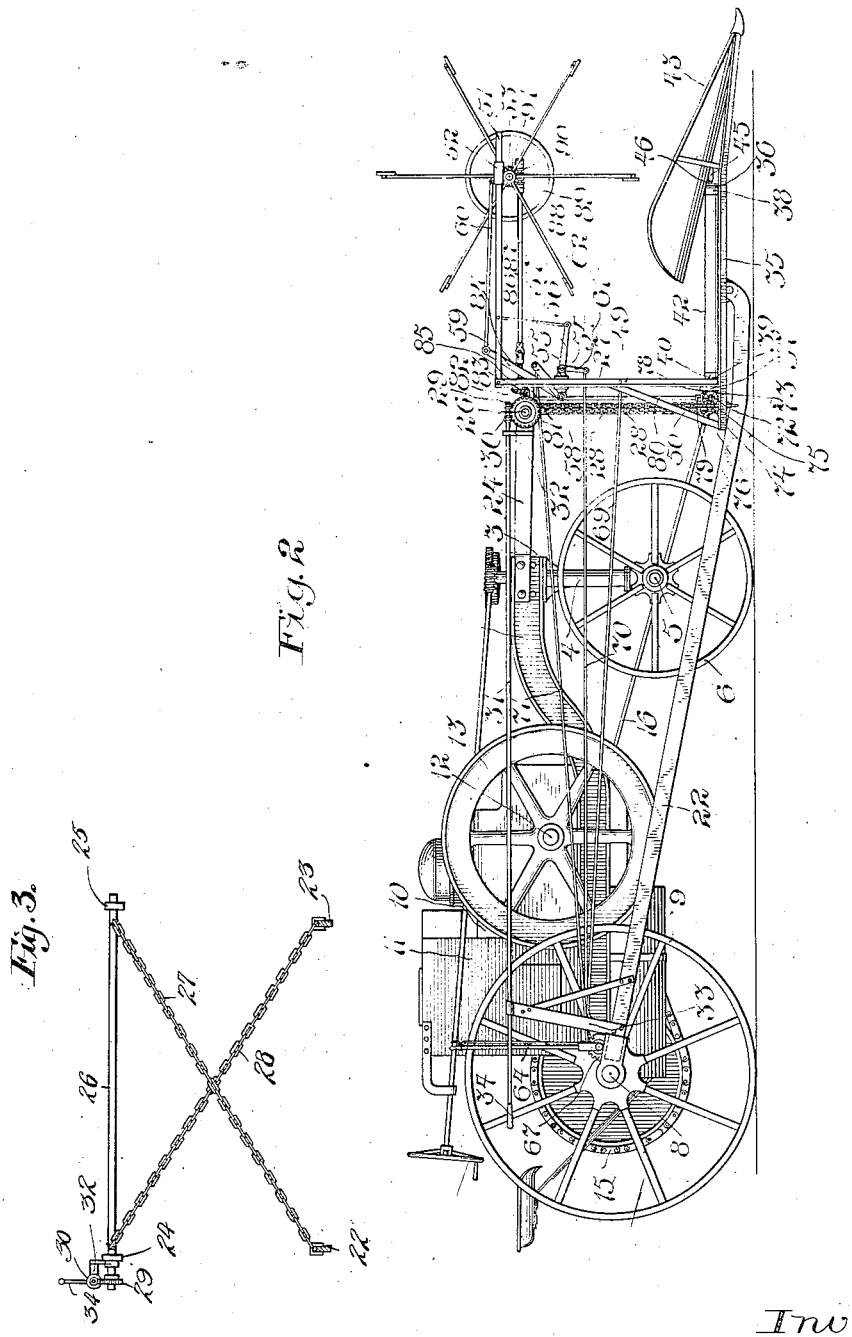

UNITED STATES PATENT OFFICE.

EDWARD W. BURGESS, OF CHICAGO, ILLINOIS, ASSIGNOR TO INTERNATIONAL HARVESTER COMPANY OF NEW JERSEY, A CORPORATION OF NEW JERSEY.

GRAIN-HARVESTER.

1,278,102.   Specification of Letters Patent.   Patented Sept. 10, 1918.

Application filed July 5, 1916. Serial No. 107,676.

*To all whom it may concern:*

Be it known that I, EDWARD W. BURGESS, a citizen of the United States, residing at Chicago, in the county of Cook and State of Illinois, have invented certain new and useful Improvements in Grain-Harvesters, of which the following is a full, clear, and exact specification.

My invention relates to grain harvesters, and in particular to means whereby the grain platform and coupling apparatus is carried by the front end of the truck frame of a tractor, having the operative parts of the harvester driven from the power transmission gearing of the tractor, and means whereby the platform may be adjusted in varying planes and angles and the reel adjusted high or low or in a fore and aft direction as desired, by the operator from the seat of the tractor.

The object of the invention is to provide a simple, light and efficient harvester adapted for tractor operation.

This object is attained by means of the mechanism illustrated in the accompanying drawings, in which—

Fig. 2 is a side elevation of Fig. 1, and

Fig. 3 shows a front elevation of the crossed flexible connections between the tractor frame and the push bars.

The same reference characters designate like parts throughout the several views.

Figure 1:
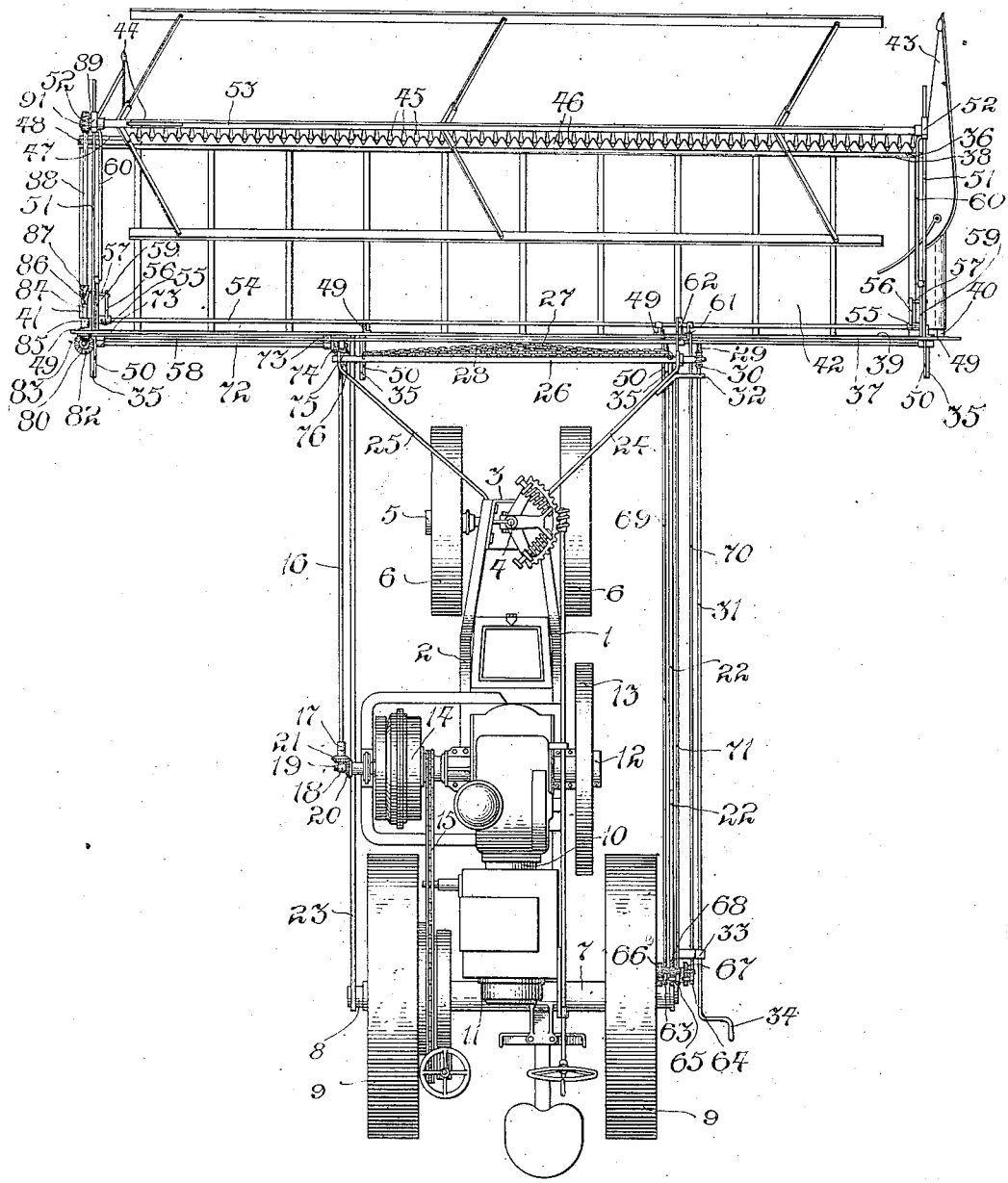
Figure 1 is a top plan view of a tractor and a harvester embodying my invention.

The tractor includes right and left-hand longitudinally disposed truck frame members 1 and 2, respectively, having a bolster member 3 secured to their front ends, in which is journaled the vertical stem 4 of a steering axle 5, having steering wheels 6 mounted upon its opposite ends, 7 a transversely disposed tubular frame member secured to the rear ends of the truck frame members, in which is journaled an axle 8, having traction wheels 9 mounted upon its opposite ends, 10 an engine mounted upon the truck frame and including a power cylinder 11, an engine shaft 12, a fly wheel 13, a power transmission gearing 14 operatively connected with the axle 8 by means including a sprocket chain 15, 16 a forwardly extending shaft having its rear end journaled in a bearing 17 forming part of an arm 18 adapted to turn about the axis of a shaft 19 operatively connected with the power transmission gearing of the tractor, and having a pinion 20 secured thereto and meshing with a pinion 21 secured to the rear end of the shaft 16 that is permitted a rising and falling movement at its front end.

22 and 23 represent forwardly extending push bars disposed at the right and left-hand sides of the tractor, respectively, and having their rear ends pivotally and detachably connected with opposite ends of the tractor axle 8. 24 and 25 represent forwardly diverging bars secured to the right and left-hand sides, respectively, of the bolster member 3, and having a transversely disposed rotatable shaft 26 journaled upon their front ends, 27 and 28 crossed chains, having their upper ends connected with opposite ends of the shaft 26 and their lower ends with the push bars 22 and 23, respectively, whereby said bars are sustained in varying planes and against a lateral swing relative to the tractor, 29 a worm wheel secured to one end of the shaft 26 and engaging with a worm 30 secured to the front end of a longitudinally disposed shaft 31 journaled in a laterally extending arm 32 secured to the bar 24, the rear end of said shaft being journaled on the upper end of a vertically disposed arm 33 having its lower end secured to the rear end of the push bar 22, and 34 represents a hand crank formed upon the rear end of the shaft 31 whereby the operator may adjust the front ends of the push bars to higher or lower planes from the seat of the tractor. The front ends of the push bars are turned upward and pivotally connected with the bottom of the grain platform 35 of the harvester, permitting a tilting movement thereof. The grain platform has a common form and includes front and rear sills 36 and 37, respectively, having carrier guides 38 and 39 secured thereto, in which are journaled carrier rollers 40 and 41 at the grainward and stubbleward ends thereof, respectively, and 42 represents an endless carrier apron mounted upon said rollers. 43 represents a divider at the grainward end of the platform, and 44 a divider at its opposite end.

The cutting apparatus includes guard fingers 45, a knife 46 operatively connected by means of a pitman 47 with a crank wheel 48 secured to the extended front end of the journal of the carrier roller 41. 49 represents vertically disposed frame bars having their lower ends secured to the rear sill 37 and braced by means of downwardly and rearwardly extending frame members 50, 51 forwardly extending reel supporting arms having their rear ends pivotally connected with the upper ends of the frame members 49, 52 bearing boxes slidably mounted upon the front ends of said arms, 53 a reel shaft journaled in said bearing boxes, 54 a rock shaft journaled in bearings 55 carried by the frame members 49 and having secured to opposite ends thereof arms 56, having their free ends connected by means of links 57 with the reel supporting arms 51, 58 a second rock shaft journaled in bearings carried by the frame members 49, and having arms 59 secured to opposite ends thereof, having their free ends connected with the slidable bearing boxes 52 by means of links 60, 61 an arm secured to the rock shaft 54 intermediate its ends, and 62 an arm secured to the second rock shaft 58 intermediate its ends.

Pivotally mounted upon the rear end of the push bar 22 adjacent the tractor axle 8 are three hand levers 63, 64 and 65, within convenient reach of the operator, each lever being provided with a common form of sliding detent mechanism adapted to operatively engage with toothed sectors 66, 67 and 68, respectively, spaced apart and carried by the bar 22. The lever 63 is connected by means of a link 69 with one of the frame members 49, whereby the grain platform may be tilted about its axis, the lever 64 by means of a link 70 with the arm 61 secured to the rock shaft 54, whereby the reel may be adjusted high or low, and the lever 65 by means of a link 71 with the arm 62 secured to the second rock shaft 58, whereby the reel may be adjusted in a fore and aft direction.

Motion is transmitted to the operative parts of the harvester by means including a shaft 72 journaled in bearings 73 carried by the rear sill 37 of the grain platform, and secured to the grainward end of the shaft is a pinion 74 meshing with a corresponding pinion 75 having a sleeve member integral therewith that is journaled in an arm 76 turnable about the axis of the shaft 72. The front end of the shaft 16 is operatively connected with the sleeve of the pinion 75 by means of a spline, permitting a longitudinal movement of the pinion upon the shaft as the grain platform is adjusted in varying planes or tilted to various operative angles. Secured to the opposite end of the shaft 72 is a pinion (not shown) meshing with a corresponding pinion 78 secured to the rearwardly extended end of the journal of the carrier roller 41, whereby motion is transmitted to the carrier apron 42 and the knife 46. The pinion not shown also meshes with a pinion 79 secured to the lower end of a vertically disposed shaft 80 journaled in bearings 81, carried by the vertical frame at the rear of the grain platform, and having a pinion 82 secured to its upper end that meshes with a corresponding pinion 83 secured to the rear end of a short shaft 84 journaled in a bearing 85 preferably integral with the upper bearing of the vertical shaft and having a universal coupling member 86 secured to its front end and connected with a corresponding coupling member 87 secured to the rear end of a forwardly extending shaft 88 having its front end journaled in bearings 89 integral with the slidable bearing box 52. 90 represents a worm splined upon the shaft 88 and engaging with a worm wheel 91 secured to the reel shaft 53, whereby motion is transmitted to the reel, the worm being free to move upon the shaft 88 when the reel is adjusted in a fore and aft direction upon the supporting arms 51, the shaft being free to rise and fall at its front end when the arms 51 are raised or lowered to adjust the reel in varying planes.

In operation the grain is cut and falling upon the endless carrier apron is delivered in a swath upon the stubble at the delivery end of the grain platform where it may remain until properly cured and then raked and elevated by a hay loader to a trailing self-loading and unloading rack drawn by the tractor.

Having shown and described one embodiment of my invention, I do not desire to have it confined closely to the specific structure shown, it being understood that changes may be made in the form, proportion and organization of its various parts without departing from the spirit of the invention as indicated by the scope of the appended claims.

What I claim as my invention, and desire to secure by Letters Patent, is:

1. In combination, a tractor including a truck frame, a harvester disposed in front of said tractor and including a grain platform, push bars disposed upon opposite sides of said tractor having their rear ends pivotally connected therewith and their front ends pivotally connected with said grain platform, a transversely disposed rotatable shaft journaled upon the front end of said truck frame, crossed flexible connections between opposite ends of said shaft and said push bars, and means for rotating said shaft in a manner to adjust the front ends of said push bars to higher or lower planes.

2. In combination, a tractor including a truck frame, an axle journaled upon the rear end of said truck frame, a harvester disposed in front of said tractor and including a grain platform, push bars disposed upon opposite sides of said tractor having their rear ends pivotally connected with opposite ends of said axle and their front ends pivotally connected with said grain platform, a transversely disposed rotatable shaft journaled upon the front end of said truck frame, crossed flexible members connecting the opposite ends of said shaft with the respective push bars at the opposite sides of the tractor, and means for rotating said shaft in a manner to adjust said grain platform to higher or lower planes.

3. In combination, a tractor including a truck frame, an axle journaled upon the rear end of said truck frame, a harvester disposed in front of said tractor and including a grain platform, push bars disposed upon opposite sides of said tractor having their rear ends pivotally connected with opposite ends of said axle and their front ends pivotally connected with said grain platform, a transversely disposed rotatable shaft journaled upon the front end of said truck frame, crossed flexible connections between the opposite ends of said shaft and said push bars, and means for rotating said shaft, said means including a worm wheel secured to said shaft, a worm meshing with said wheel and secured to the front end of a longitudinally disposed shaft having its rear end journaled in a bearing member carried by one of said push bars and provided with an operating crank.

4. In combination, a tractor including a truck frame, an axle, a power transmission gear mechanism, a forwardly extending shaft having its rear end operatively connected with said power transmission gear mechanism, a harvester disposed in front of said tractor and including a grain platform, an endless carrier apron, a cutting apparatus, and a reel, push bars having their rear ends pivotally connected with said tractor and said grain platform mounted upon their front ends, means for raising and lowering said push bars about their pivotal connections, including crossed flexible connections between the front ends of said push bars and an element carried by said tractor, and operative connections between the front end of said forwardly extending shaft and the operative parts of said harvester.

5. In combination, a tractor including a truck frame, grain cutting mechanism disposed in front of said tractor, push bars connecting said cutting mechanism and said tractor, and crossed flexible connections for suspending said cutting mechanism from said tractor frame.

6. In combination, a tractor including a truck frame, grain cutting mechanism disposed in front of said tractor, push bars connected to said cutting mechanism and pivotally connected to said tractor, and crossed flexible connections for suspending said cutting mechanism from said tractor frame.

7. In combination, a tractor including a truck frame, grain cutting mechanism disposed in front of said tractor, push bars connecting said cutting mechanism and said tractor, crossed flexible connections for suspending said cutting mechanism from said tractor frame, and means for adjusting said flexible connections to raise and lower said cutting mechanism with respect to the tractor frame.

8. In combination, a tractor including a truck frame, grain cutting mechanism disposed in front of said tractor, push bars pivotally connected at their rear ends with said tractor and at their front ends to said cutting mechanism, crossed flexible connections between said tractor and said push bars for suspending the cutting mechanism from the tractor frame, and means for adjusting said flexible connections to raise and lower said cutting mechanism with respect to the tractor frame.

In testimony whereof I affix my signature.

EDWARD W. BURGESS.